United States Patent
Mashtare et al.

(10) Patent No.: US 10,338,202 B2
(45) Date of Patent: Jul. 2, 2019

(54) SYSTEM AND METHOD FOR IMPROVING LIDAR SENSOR SIGNAL AVAILABILITY ON A WIND TURBINE

(71) Applicant: General Electric Company, Schenectady, NY (US)

(72) Inventors: Dale Robert Mashtare, Simpsonville, SC (US); Samuel David Draper, Simpsonville, SC (US); Thomas Stephen Markham, Glenville, NY (US); Conner B. Shane, Glenville, NY (US); Katherine Derksen Stinson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 637 days.

(21) Appl. No.: 15/008,858

(22) Filed: Jan. 28, 2016

(65) Prior Publication Data

US 2017/0219697 A1    Aug. 3, 2017

(51) Int. Cl.
*F03D 7/04* (2006.01)
*G01P 5/26* (2006.01)
(Continued)

(52) U.S. Cl.
CPC .......... *G01S 7/4972* (2013.01); *F03D 1/0675* (2013.01); *F03D 17/00* (2016.05);
(Continued)

(58) Field of Classification Search
None
See application file for complete search history.

(56) References Cited

U.S. PATENT DOCUMENTS 6,320,272 B1 * 11/2001 Lading ............... F03D 7/0224
                                                        290/44
7,391,506 B2 * 6/2008 Harris ..................... G01S 7/493
                                                        356/28.5
(Continued)

FOREIGN PATENT DOCUMENTS

| EP | 2 017 470 A1 | 1/2009 |
| EP | 1597592 B1 | 5/2009 |
| EP | 2 853 729 A1 | 4/2015 |
| WO | WO2011/150942 A1 | 12/2011 |

OTHER PUBLICATIONS

Davoust, S., et al., "Assessment and Optimization of Lidar Measurement Availability for Wind Turbine Control," Presented at EWEA, pp. 1-10 (Mar. 10-13, 2014).
(Continued)

*Primary Examiner* — Kayla Mccaffrey
(74) *Attorney, Agent, or Firm* — Dority & Manning, P.A.

(57) ABSTRACT

The present subject matter is directed to a system and method for sequencing Light Detecting and Ranging (LIDAR) sensor beam signals from a LIDAR sensor mounted on a nacelle of a wind turbine with the rotor position of the wind turbine so as to improve signal availability. More specifically, the method includes generating, via the LIDAR sensor, one or more laser signals towards the rotor of the wind turbine, the rotor having one or more rotor blades. The method also includes receiving, via a controller, a rotor position of the rotor of the wind turbine. Thus, the method further includes coordinating, via a control algorithm programmed within the controller, the rotor position with the one or more laser signals of the laser sensor so as to minimize interference between the laser signal(s) and the rotor blades during rotation of the rotor.

19 Claims, 8 Drawing Sheets

(51) Int. Cl.
    *G01S 7/497*     (2006.01)
    *F03D 17/00*     (2016.01)
    *F03D 1/06*     (2006.01)
    *G01S 7/481*     (2006.01)
    *G01S 17/95*     (2006.01)
    *G01S 17/58*     (2006.01)

(52) U.S. Cl.
    CPC ............ *G01S 7/4818* (2013.01); *G01S 7/497* (2013.01); *G01S 17/58* (2013.01); *G01S 17/95* (2013.01); *F05B 2240/221* (2013.01); *F05B 2260/83* (2013.01); *F05B 2270/8042* (2013.01); *Y02A 90/19* (2018.01); *Y02E 10/721* (2013.01); *Y02E 10/726* (2013.01)

(56) References Cited

U.S. PATENT DOCUMENTS

| | | | |
|---|---|---|---|
| 8,622,698 B2 * | 1/2014 | Kristoffersen | F03D 7/0224<br>290/44 |
| 2012/0169053 A1 * | 7/2012 | Tchoryk, Jr. | G01P 5/26<br>290/44 |
| 2014/0226153 A1 * | 8/2014 | Sun | B64C 27/008<br>356/139.03 |

OTHER PUBLICATIONS

International Search Report and Written Opinion issued in connection with corresponding PCT Application No. PCT/US17/15576 dated Apr. 13, 2017.

\* cited by examiner

SYSTEM AND METHOD FOR IMPROVING LIDAR SENSOR SIGNAL AVAILABILITY ON A WIND TURBINE

FIELD OF THE INVENTION

The present invention relates generally to wind turbines, and more particularly, to systems and methods for sequencing Light Detecting and Ranging (LIDAR) sensor beam signals with the rotor position of a wind turbine so as to improve signal availability.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Changes in atmospheric conditions, for example, wind speed, wind turbulence, wind gusts, wind direction, and/or air density may significantly influence power produced by the generator. More specifically, a power output of the generator increases with wind speed until the wind speed reaches a rated wind speed for the turbine. At and above the rated wind speed, the generator operates at rated power. The rated power is an output power at which the generator can operate with a level of fatigue or extreme load to turbine components that is predetermined to be acceptable. At wind speeds higher than a certain speed, typically referred to as a "trip limit," the wind turbine may implement a control action, such as shutting down or de-rating the wind turbine in order to protect wind turbine components from damage.

Conventional systems and methods for controlling wind turbines during such transient wind conditions utilize one or more sensors positioned on the wind turbine to detect wind conditions. For example, a wind speed sensor positioned on the wind turbine measures a wind gust at substantially the same time as the wind gust strikes the rotor blades. As such, wind turbine operation adjustments are subject to a time lag between measurement of the wind gust and the control action. As a result, the wind gust may cause rotor acceleration that will create excessive turbine loading and/or fatigue. In some instances, the wind gust may cause the rotor speed or power output to exceed a trip limit, before a wind turbine operation adjustment is completed, causing the wind turbine to be shut down.

Modern systems and methods for controlling wind turbines utilize upwind measuring sensors, such as Light Detecting and Ranging (LIDAR) sensors, to address the aforementioned time lag. As such, a change in wind acceleration may be measured upwind from the wind turbine, and the control action may be preemptively adjusted to compensate for the change in wind speed once the wind reaches the wind turbine.

Typically, LIDAR sensors operate by scattering radiation from natural aerosols (dust, pollen, water droplets, etc.) and measure the Doppler shift between the outgoing and incoming radiation. Thus, to measure the wind speed and direction upwind of the wind turbine, the LIDAR sensor scans the wind vector, typically using a conical scan, such that the vector can be intersected at a range of angles, thereby enabling the true (3D) velocity vector to be deduced. Sequential switching of fiber optic-based laser signals in the optical chain of the LIDAR sensor is commonly applied to develop different beam line of sight measurements of wind vectors in front of the wind turbine rotor. This is common to both pulsed Doppler and continuous wave LIDAR systems applied in application.

LIDAR sensors are mounted on the wind turbine in such a manner to minimize interference with the wind turbine structures that would occlude the laser beam path. However, when LIDAR sensors are mounted on the nacelle, rotor rotation can result in partial blocking of the LIDAR beam signals. This impact can be significant, e.g. reducing the beam signal availability to 30% to 60% due to this geometric effect. Thus, certain control systems apply signal averaging and/or selective signal applications for wind turbines utilizing LIDAR measurements to reduce the blocking impact of the rotor blades as the hub rotates. Such control systems, however, substantially reduce the LIDAR signal availability and the quality of the wind field assessments of impinging wind vectors.

In view of the aforementioned, an improved system and method for improving signal availability of LIDAR sensors mounted on a nacelle of a wind turbine would be desired in the art. Thus, the present disclosure is directed to sequencing LIDAR sensor beam signals with the rotor position of a wind turbine so as to improve signal availability.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for improving signal availability of a laser sensor mounted on a nacelle of a wind turbine. The method includes generating, via the laser sensor, one or more laser signals towards a rotor of the wind turbine. The rotor includes one or more rotor blades mounted on a rotatable hub. Thus, the method also includes receiving, via a controller, a rotor position of the rotor of the wind turbine. Thus, the method further includes coordinating, via a control algorithm programmed within the controller, the rotor position with the one or more laser signals of the laser sensor so as to minimize interference between the laser signal(s) and the rotor blades during rotation of the rotor.

In one embodiment, the laser sensor may be a Light Detecting and Ranging (LIDAR) sensor. Thus, in certain embodiments, the laser signal(s) may include fiber-optic-based laser signals. In additional embodiments, the controller may be a LIDAR controller, a wind turbine controller, or any other suitable controller associated with the wind turbine.

In another embodiment, the method may include detecting, via one or more sensors, the rotor position of the rotor. More specifically, in certain embodiments, the sensor(s) may include main shaft positional sensors, hub sensors, pitch system sensors, the LIDAR sensor, or any other suitable sensors configured to detect the rotor position of the rotor.

In further embodiments, the method may also include optimizing a mounting location of the laser sensor on the nacelle of the wind turbine so as to minimize interference of the rotor blades with the one or more laser signals. In additional embodiment, the method may include optimizing geometry of the one or more laser signals. More specifically, in certain embodiments, the geometry of the one or more laser signals may include at least one of cone angle shape, fore-aft orientation, and/or side-to-side orientation of the laser signal(s).

In such embodiments, the step of coordinating the rotor position with the laser signal(s) of the laser sensor may include receiving the geometry of the laser signal(s) as well as one or more laser signal switch times, and defining, via the control algorithm, a sequencing control scheme for the laser sensor based on the laser signal(s) and the switch times.

In yet another embodiment, the step of coordinating the rotor position with the laser signal(s) of the laser sensor may include switching one or more of the laser signal(s) off as one of the rotor blades rotates through a path of the laser signal(s) and/or switching the one or more of the laser signals on when the rotor blades are not in the path of the laser signal(s).

In additional embodiments, the step of coordinating the rotor position with the laser signal(s) of the laser sensor may include switching a rotational direction of the one or more laser signals, e.g. clockwise or counter clockwise.

In another aspect, the present disclosure is directed to a method for optimizing operation of a wind turbine having a rotor with one or more rotor blade. The method includes generating, via a LIDAR sensor mounted on a nacelle of the wind turbine, one or more laser signals towards the rotor. Another step includes receiving, via a controller of the LIDAR sensor, a rotor position of the rotor. A further step includes coordinating, via a control algorithm programmed within the controller of the LIDAR sensor, the rotor position with the one or more laser signals of the LIDAR sensor. Thus, the method also includes defining, via the control algorithm, a sequencing control scheme based on the coordination so as to minimize interference between the laser signal(s) and the rotor blades during rotation of the rotor. It should be understood that the method may further include any of the additional steps and/or features as described herein.

In yet another aspect, the present disclosure is directed to a system for improving signal availability of a Light Detecting and Ranging (LIDAR) sensor mounted on a nacelle of a wind turbine. The system includes one or more sensors configured to generate signals indicative of a rotor position of a rotor of the wind turbine having one or more rotor blades. Further, the sensors include at least one LIDAR sensor configured to generate one or more laser signals towards the rotor of the wind turbine. The system also includes a controller configured to receive the one or more laser signals. Further, the controller is pre-programmed with at least one control algorithm configured to coordinate the rotor position with the one or more laser signals of the LIDAR sensor so as to minimize interference between the laser signal(s) and the rotor blades during rotation of the rotor. It should be understood that the system may further include any of the additional features as described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
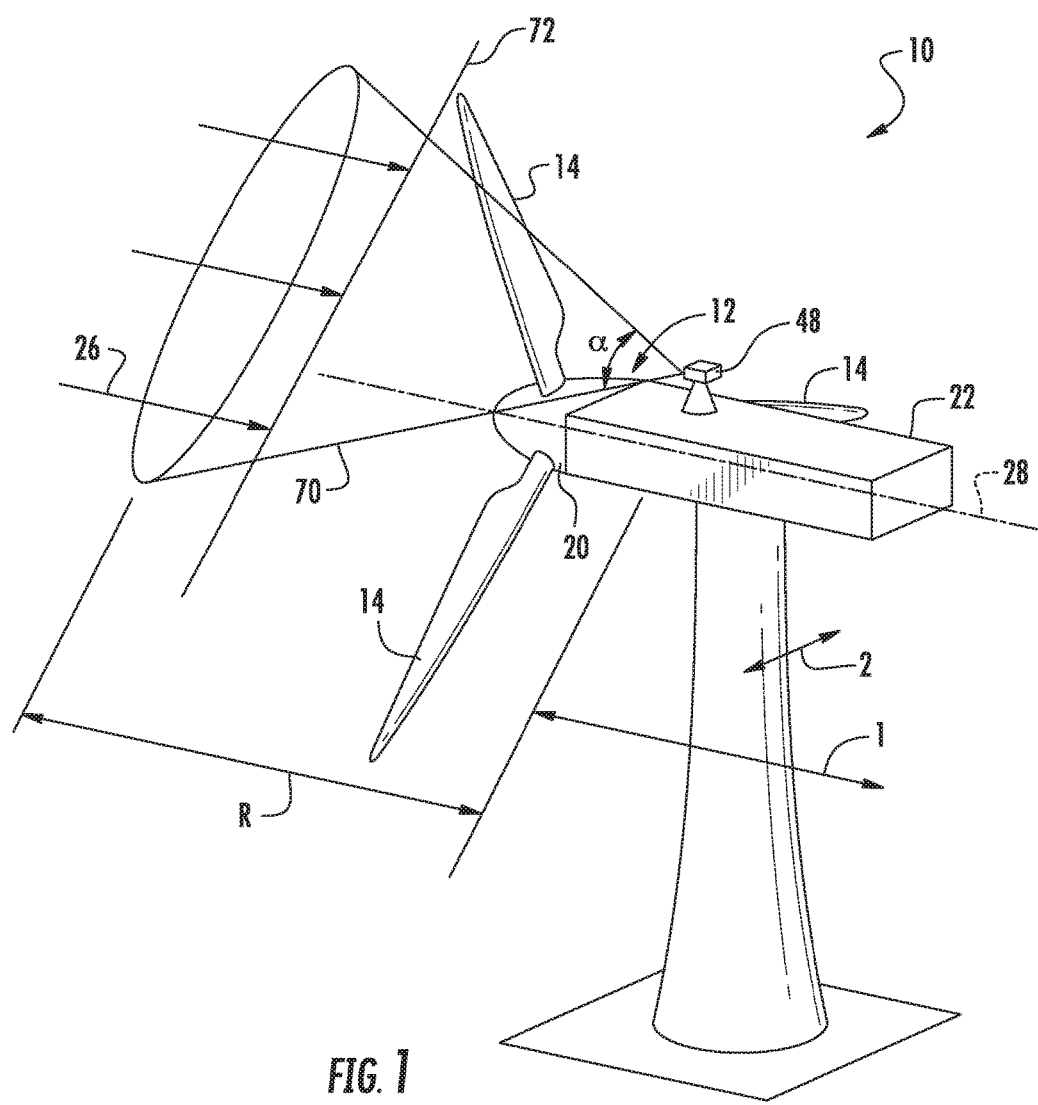
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for sequencing Light Detecting and Ranging (LIDAR) sensor beam signals from a LIDAR sensor mounted on a nacelle of a wind turbine with the rotor position of the wind turbine so as to improve signal availability. More specifically, the method includes generating, via the LIDAR sensor, one or more laser signals towards the rotor of the wind turbine, the rotor having one or more rotor blades. The method also includes receiving, via a controller (e.g. a LIDAR controller or a wind turbine controller), a rotor position of the rotor of the wind turbine. Thus, the method further includes coordinating, via a control algorithm programmed within the controller, the rotor position with the laser signal(s) of the laser sensor so as to minimize interference between the laser signal(s) and the rotor blades during rotation of the rotor.

Referring now to the drawings, FIG. 1 illustrates a wind turbine 10 in accordance with aspects of the present disclosure. The wind turbine 10 includes a rotor 12 having a plurality of rotor blades 14 mounted on a hub 20. The wind turbine 10 also includes a nacelle 22 that is mounted atop a tower 16. The rotor 12 is operatively coupled to an electrical generator via drive train (not shown) housed within the nacelle 22. The tower 16 exposes the rotor blades 14 to the wind (directionally represented by arrow 26), which causes the blades 14 to rotate about a rotor axis 28. The blades 14 transform the kinetic energy of the wind into a rotational torque, which is further transformed into electrical energy via the electrical generator.

Figure 2:
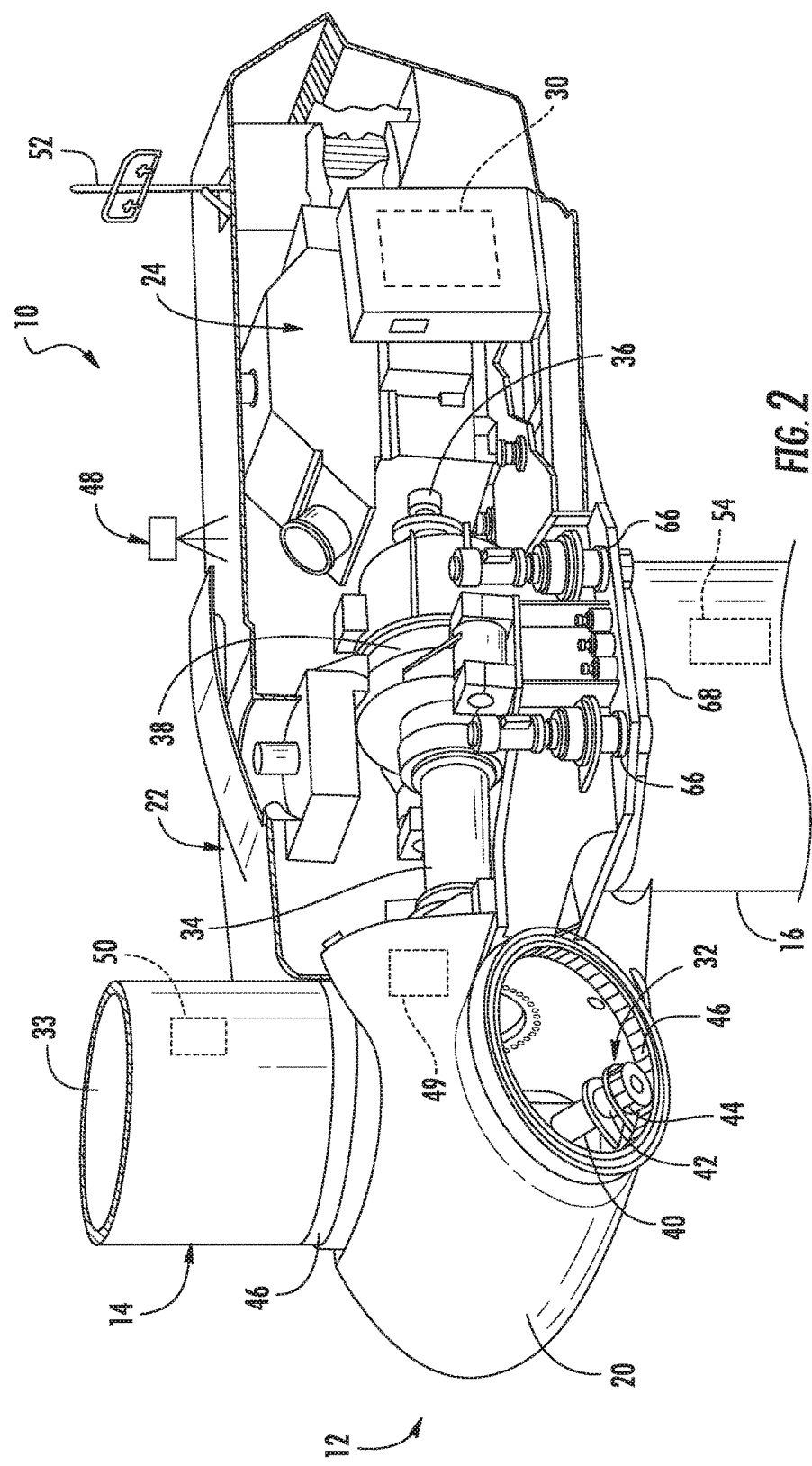
FIG. 2 illustrates a simplified, internal view of one embodiment of a nacelle of a wind turbine according to the present disclosure.

Referring now to FIG. 2, a simplified, internal view of one embodiment of the nacelle 22 of the wind turbine 10 shown in FIG. 1 is illustrated. As shown, a generator 24 may be disposed within the nacelle 22. In general, the generator 24 may be coupled to the rotor 12 for producing electrical power from the rotational energy generated by the rotor 12. For example, as shown in the illustrated embodiment, the rotor 12 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 14 and the hub 20. The gearbox 38 may then be configured to convert the low speed, high torque input to a high speed, low torque output to drive the generator shaft 36 and, thus, the generator 24.

The wind turbine 10 may also include a controller 30 centralized within the nacelle 22. Alternatively, the controller 30 may be located within any other component of the wind turbine 10 or at a location outside the wind turbine. Further, the controller 30 may be communicatively coupled to any number of the components of the wind turbine 10 in order to control the operation of such components and/or implement various method steps as described herein. As such, the controller 30 may include a computer or other suitable processing unit. Thus, in several embodiments, the controller 30 may include suitable computer-readable instructions that, when implemented, configure the controller 30 to perform various different functions, such as receiving, transmitting and/or executing wind turbine control signals. Accordingly, the controller 30 may generally be configured to control the various operating modes (e.g., start-up or shut-down sequences), de-rate the wind turbine, and/or control various components of the wind turbine 10 as will be discussed in more detail below.

Still referring to FIG. 2, each rotor blade 14 may also include a pitch adjustment mechanism 32 configured to rotate each rotor blade 14 about its pitch axis 33. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 14 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 14 about the pitch axis 33. Similarly, the wind turbine 10 may include one or more yaw drive mechanisms 66 communicatively coupled to the controller 30, with each yaw drive mechanism(s) 66 being configured to change the angle of the nacelle 22 relative to the wind (e.g., by engaging a yaw bearing 68 of the wind turbine 10).

Figure 3:
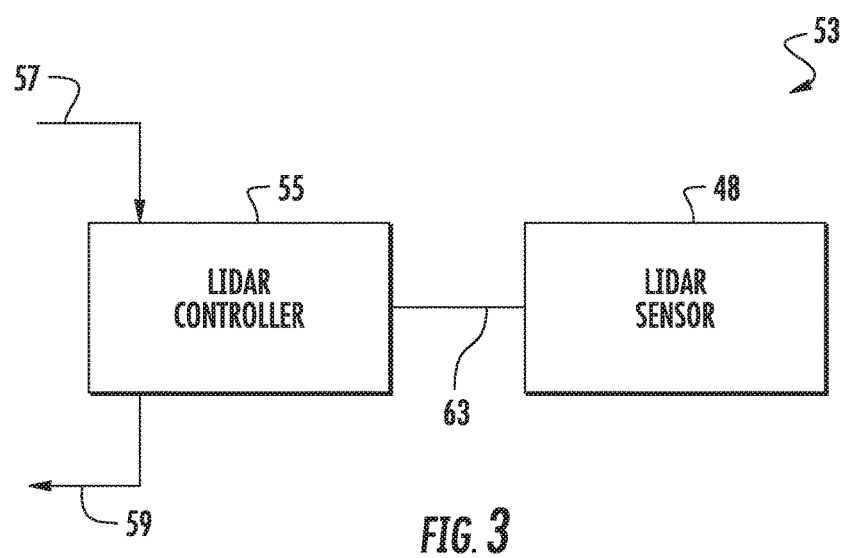
FIG. 3 illustrates a block diagram of one embodiment of a LIDAR system according to the present disclosure.

Referring to FIGS. 1-3, the wind turbine 10 may include one or more sensors 48, 49, 50, 52, 54 for measuring various wind parameters upwind of the wind turbine 10 as well as various turbine operating conditions. For example, as shown in FIG. 1, sensor 48 is located on the nacelle 22 so as to measure an actual wind parameter upwind from the wind turbine 10. The actual wind parameter may be any of the following: wind gust, wind speed, wind direction, wind acceleration, wind turbulence, wind shear, wind veer, wake, or similar. Further, the sensor(s) 48 may include at least one LIDAR sensor for measuring such upwind parameters. For example, as shown in FIG. 1, the LIDAR sensor(s) 48 may include a measurement radar configured to scan an annular region around the wind turbine 10 and measure wind speed based upon reflection and/or scattering of light transmitted by the LIDAR sensor(s) 48 from aerosol. In addition, as shown, the cone angle (θ) and the range (R) of the LIDAR sensor 48 may be suitably selected to provide a desired accuracy of measurement as well as an acceptable sensitivity. The points ahead of the blades 14 at which wind speed is measured by the LIDAR sensor 48 is represented by plane 72 as shown in FIG. 1.

In addition, as shown in FIGS. 2 and 3, the wind turbine 10 may also include one or more wind turbine sensors 49, 50, 52, 54 capable of measuring wind parameters upwind of the wind turbine 10 and/or operating parameters of the wind turbine 10. For example, as shown in FIG. 2, the sensors include hub sensors 49, blade sensors 50, wind sensors 52, and/or tower sensors 54. Such sensors may be accelerometers, pressure sensors, angle of attack sensors, vibration sensors, MIMU sensors, camera systems, fiber optic systems, anemometers, wind vanes, LIDAR sensors, Sonic Detection and Ranging (SODAR) sensors, infra lasers, radiometers, pitot tubes, rawinsondes, other optical sensors, and/or any other suitable sensors. It should be appreciated that, as used herein, the term "monitor" and variations thereof indicates that the various sensors of the wind turbine may be configured to provide a direct measurement of the parameters being monitored or an indirect measurement of such parameters. Thus, the sensors 48, 49, 50, 52, 54 as described herein may, for example, be used to generate signals relating to the parameter being monitored, which can then be utilized by the controller 30 to determine the actual condition.

Referring to FIG. 3, the LIDAR sensor 48 may be communicatively coupled to a LIDAR controller 55. The LIDAR controller 55 may have one or more connections 57, 59 connecting the controller 55 to a power source and/or a control unit (not shown) within the nacelle 22. In addition, the output of the controller 55 may be communicated by a fiber optic link 63 or by wireless communication. In addition, the LIDAR controller 55 may be pre-programmed with a control algorithm configured to coordinate the rotor position of the rotor 12 with one or more laser signals 70 of the LIDAR sensor 48 so as to minimize interference between the laser signal(s) 70 and the rotor blades 14 during rotation of the rotor 12.

Figure 4:
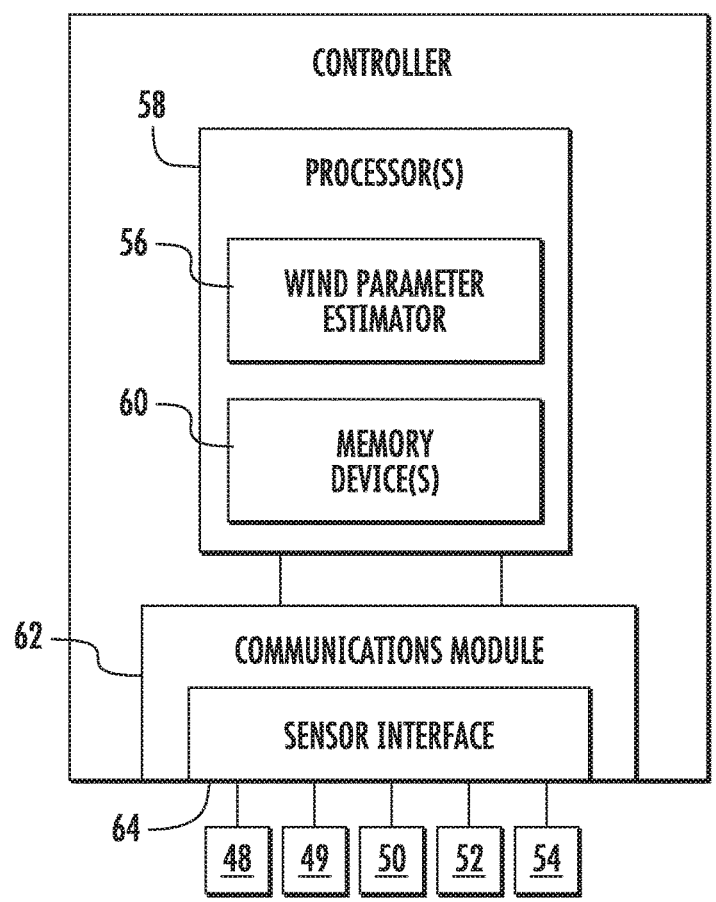
FIG. 4 illustrates a schematic diagram of one embodiment of a controller according to the present disclosure.

Referring now to FIG. 4, there is illustrated a block diagram of one embodiment of the controller 30 (or LIDAR controller 55) according to the present disclosure. As shown, the controller 30 may include one or more processor(s) 58, a wind parameter estimator 56, and associated memory device(s) 60 configured to perform a variety of computer-implemented functions (e.g., performing the methods, steps, calculations and the like and storing relevant data as disclosed herein). Additionally, the controller 30 may also include a communications module 62 to facilitate communications between the controller 30 and the various components of the wind turbine 10. Further, the communications module 62 may include a sensor interface 64 (e.g., one or more analog-to-digital converters) to permit signals transmitted from the sensors 48, 49, 50, 52, 54 to be converted into signals that can be understood and processed by the processors 58. It should be appreciated that the sensors 48, 49, 50, 52, 54 may be communicatively coupled to the communications module 62 using any suitable means. For example, as shown in FIG. 4, the sensors 48, 49, 50, 52, 54 are coupled to the sensor interface 64 via a wired connection. However, in other embodiments, the sensors 48, 49, 50, 52, 54 may be coupled to the sensor interface 64 via a wireless connection, such as by using any suitable wireless communications protocol known in the art. As such, the processor 58 may be configured to receive one or more signals from the sensors 48, 49, 50, 52, 54.

The wind parameter estimator 56 may be considered software that utilizes the plurality of operating data to calculate, in real-time, the estimated wind parameter. Further, the wind parameter estimator 56 may include firmware that includes the software, which may be executed by the processor 58. Further, the wind parameter estimator 56 may be in communication the various sensors and devices of the wind turbine 10, which may provide the plurality of operating data to the wind parameter estimator 56.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 30 to perform various functions including, but not limited to, estimating one or more wind parameters of the wind turbine 10 based on the plurality of operating data, transmitting suitable control signals to implement control actions in response to the detection of transient wind conditions and various other suitable computer-implemented functions.

Figure 5:
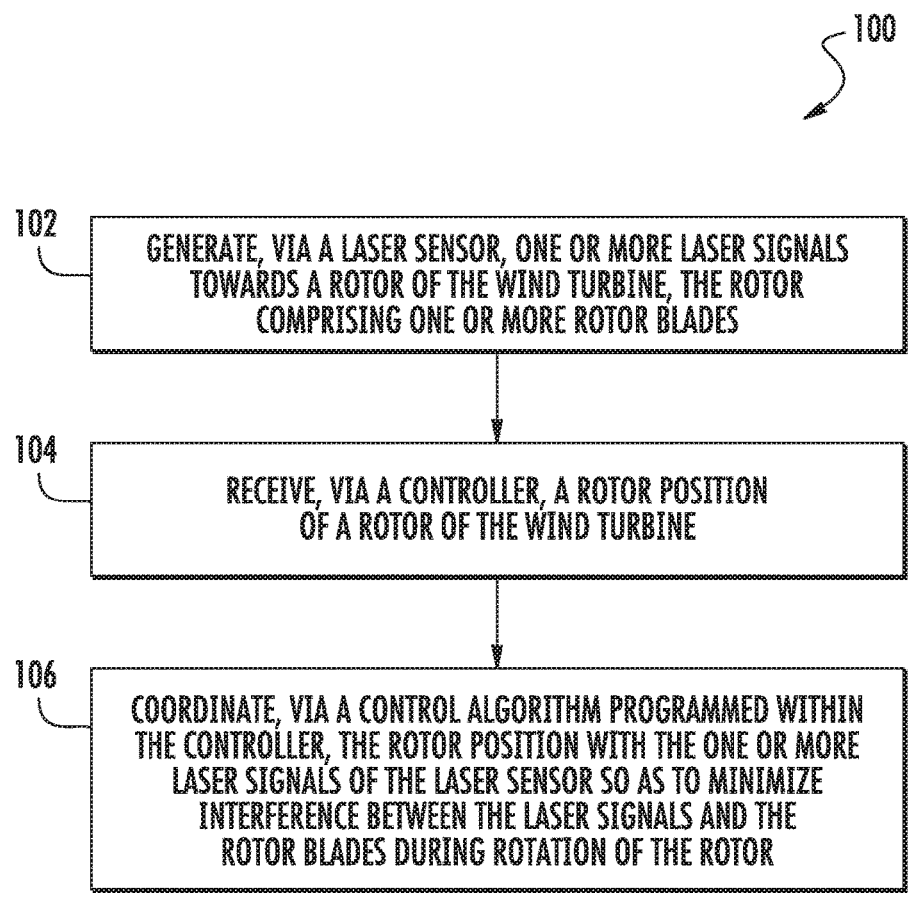
FIG. 5 illustrates a flow diagram of one embodiment of a method according to the present disclosure.
Figure 6:
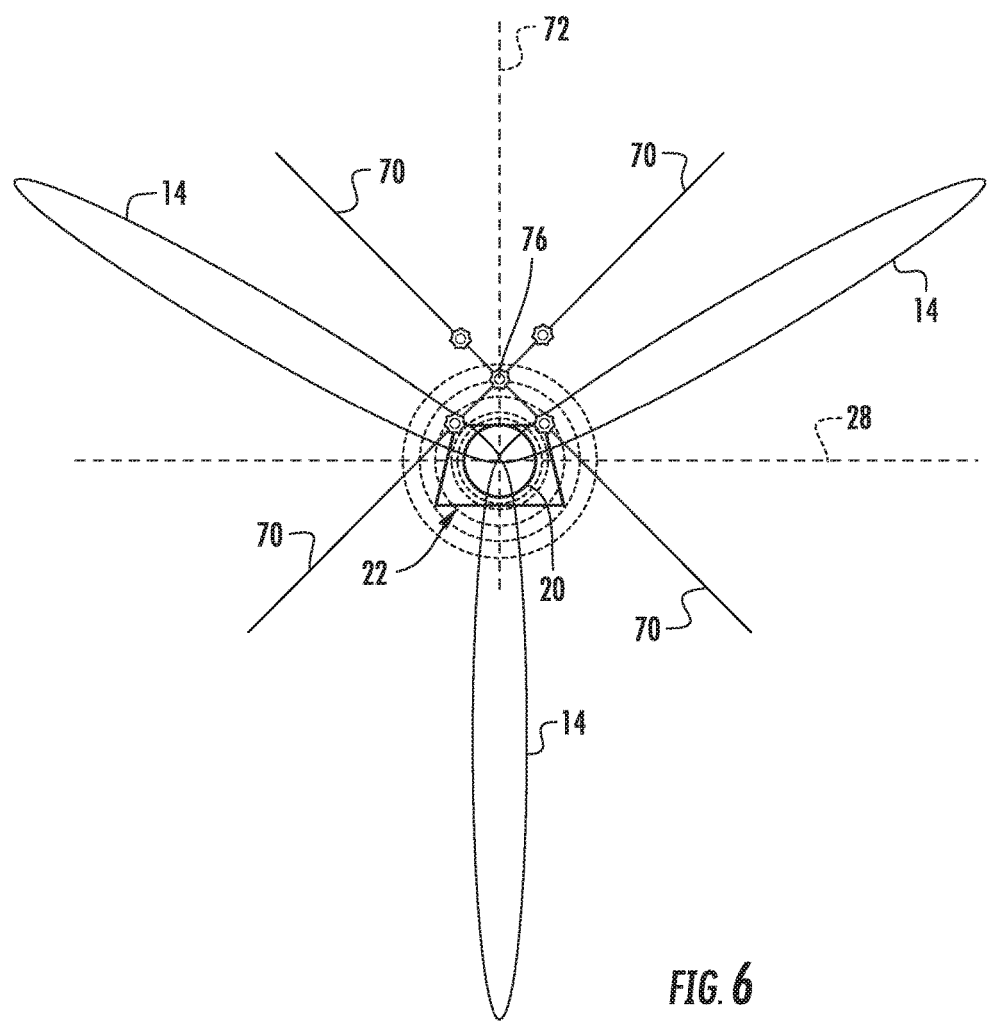
FIG. 6 illustrates a front view of one embodiment of a wind turbine having LIDAR sensor mounted on a nacelle thereof according to the present disclosure.

Referring now to FIG. 5, a flow diagram of one embodiment of a method 100 for improving signal availability of a laser sensor, e.g. a LIDAR sensor, mounted on the nacelle 22 of the wind turbine 10 is illustrated. As shown at 102, the method 100 includes generating, via the LIDAR sensor 48, one or more laser signals or beams 70 towards the rotor 12 of the wind turbine 10. More specifically, in certain embodiments, the laser signal(s) 70 may include fiber-optic-based laser signals. As shown at 104, the method 100 may also include receiving, via a controller (e.g. turbine controller 30 or LIDAR controller 55), a rotor position of the rotor 12 of the wind turbine 10. As used herein, the rotor position generally refers to the position of the rotor 12 that describes the location of each of the rotor blades 14 with respect to rotor plane 72. For example, as shown in FIG. 6, the rotor position includes two of the rotor blades 14 in a rabbit-eared configuration with the third rotor blade 14 in a six o'clock position. Thus, as shown, the LIDAR sensor 48 can take a wind parameter measurement e.g. at point 76 which does not intersect the blades 14.

Referring still to FIG. 5, as shown at 106, the method 100 includes coordinating, via a control algorithm programmed within the controller (e.g. 30 or 55), the rotor position with the one or more laser signals 70 of the LIDAR sensor 48 so as to minimize interference between the laser signal(s) 70 and the rotor blades 14 during rotation of the rotor 12. For example, in one embodiment, the method 100 may include detecting, via one or more sensors (e.g. sensors 48, 49, 50, 52, 54) the rotor position of the rotor 12. More specifically, in certain embodiments, the sensor(s) 48, 49, 50, 52, 54 may include main shaft positional sensors, hub sensors, pitch system sensors, the LIDAR sensor 48, or any other suitable sensors configured to detect the rotor position.

Figure 7:
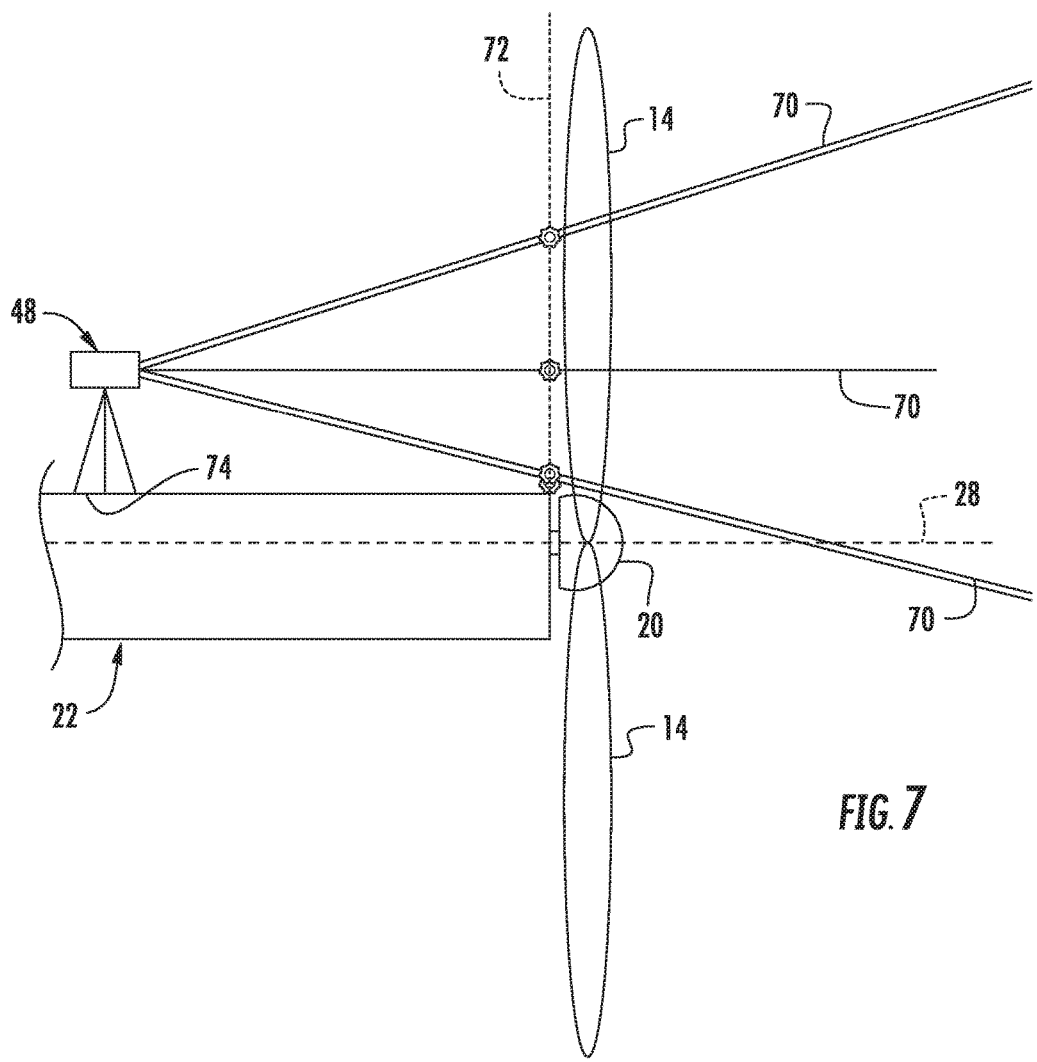
FIG. 7 illustrates a side view of one embodiment of a wind turbine having LIDAR sensor mounted on a nacelle thereof according to the present disclosure; and, FIG. 8 illustrates a flow diagram of another embodiment of a method according to the present disclosure.

In further embodiments, the method 100 may also include optimizing a mounting location 74 of the LIDAR sensor 48 on the nacelle 22 of the wind turbine 10 so as to minimize interference of the rotor blades 14 with the one or more of the laser signals 70 as shown in FIG. 7. In additional embodiments, as shown in FIGS. 6 and 7, the method 100 may include optimizing geometry of the laser signals 70. More specifically, in certain embodiments, the geometry of the laser signals 70 may include at least one of cone angle shape, fore-aft orientation, or side-to-side orientation of the laser signals 70. For example, as shown particularly in FIG. 7, the mounting location 74 of the LIDAR sensor 48 may be chosen so as to minimize interference of the rotor blades 14 with the top, middle, or bottom laser beams 70.

In such embodiments, the step of coordinating the rotor position with the laser signals 70 of the LIDAR sensor 48 may include receiving the geometry of the laser signals 70 as well as laser signal switch times, and defining, via the control algorithm, a sequencing control scheme for the LIDAR sensor 48 based on the geometry and/or the switch times.

In yet another embodiment, the step of coordinating the rotor position with the laser signals 70 of the LIDAR sensor 48 may include switching one or more of the laser signals 70 off as one of the rotor blades 14 rotates through a path of the laser signals 70 and/or switching one or more of the laser signals 70 on when the rotor blades 14 are not in the path of the laser signals 70. In additional embodiments, the LIDAR controller 55 may also be configured to switch a rotational direction of the one or more laser signals 70, e.g. clockwise or counter clockwise.

Figure 8:
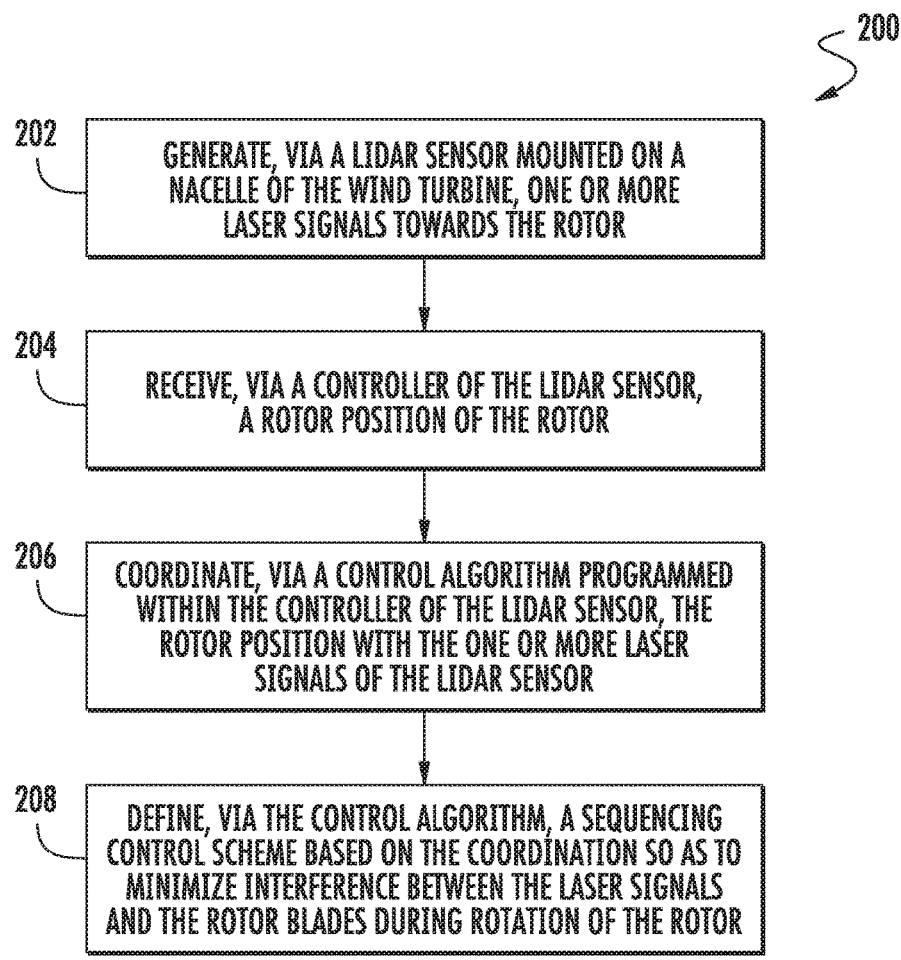

Referring now to FIG. 8, a flow diagram of one embodiment of a method 200 for optimizing operation of a wind turbine 10 having a rotor 12 with one or more rotor blade 14 is illustrated. As shown at 202, the method 200 includes generating, via a LIDAR sensor 48 mounted on a nacelle 22 of the wind turbine 10, one or more laser signals towards the rotor 12. As shown at 204, the method 200 includes receiving, via a controller 55 of the LIDAR sensor 48 (FIG. 3), a rotor position of the rotor 12. As shown at 206, the method 200 includes coordinating, via a control algorithm programmed within the controller 55 of the LIDAR sensor 48, the rotor position with the one or more laser signals of the LIDAR sensor 48. As shown at 208, the method 200 includes defining, via the control algorithm, a sequencing control scheme based on the coordination so as to minimize interference between the laser signal(s) 70 and the rotor blades 14 during rotation of the rotor 12.

It should also be appreciated that an advantage of the present invention is that the system and method may be implemented using existing components of the wind turbine 10. As such, a user is not required to purchase, install, and maintain new equipment. Further, the controller 30 may be integrated with a broader control system, such as, but not limiting of, a wind turbine control system, a plant control system, a remote monitoring system, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for improving signal availability of a laser sensor mounted on a nacelle of a wind turbine, the method comprising:
    generating, via the laser sensor, one or more laser signals towards a rotor of the wind turbine, the rotor comprising one or more rotor blades mounted to a rotatable hub;
    receiving, via a controller, a rotor position of the rotor of the wind turbine; and,
    coordinating, via a control algorithm programmed within the controller, the rotor position with the one or more laser signals of the laser sensor so as to minimize interference between the laser signals and the rotor blades during rotation of the rotor, wherein coordinating the rotor position with the one or more laser signals of the laser sensor further comprises switching a rotational direction of the one or more laser signals.

2. The method of claim 1, wherein the laser sensor comprises a Light Detecting and Ranging (LIDAR) sensor.

3. The method of claim 2, wherein the one or more laser signals comprise fiber-optic-based laser signals.

4. The method of claim 2, wherein the controller comprises at least one of a LIDAR controller or a wind turbine controller.

5. The method of claim 2, further comprising detecting, via one or more sensors, the rotor position of the rotor.

6. The method of claim 5, wherein the one or more sensors comprise at least one of main shaft positional sensors, hub sensors, pitch system sensors, or the LIDAR sensor.

7. The method of claim 1, further comprising optimizing a mounting location of the laser sensor on the nacelle of the wind turbine so as to minimize interference of the rotor blades with the one or more laser signals.

8. The method of claim 1, further comprising optimizing geometry of the one or more laser signals, wherein the geometry of the one or more laser signals further comprises at least one of cone angle shape, fore-aft orientation, or side-to-side orientation of the one or more laser signals.

9. The method of claim 8, wherein coordinating the rotor position with the one or more laser signals of the laser sensor further comprises:
    receiving the geometry of the one or more laser signals and one or more laser signal switch times, and
    defining, via the control algorithm, a sequencing control scheme for the laser sensor.

10. The method of claim 1, wherein coordinating the rotor position with the one or more laser signals of the laser sensor further comprises switching the one or more laser signals off as one of the rotor blades rotates through a path of the one or more laser signals.

11. The method of claim 10, wherein coordinating the rotor position with the one or more laser signals of the laser sensor further comprises switching the one or more laser signals on if the rotor blades are not in the path of the one or more laser signals.

12. A method for optimizing operation of a wind turbine having a rotor with one or more rotor blades, the method comprising:
    generating, via a LIDAR sensor mounted on a nacelle of the wind turbine, one or more laser signals towards the rotor;
    receiving, via a controller of the LIDAR sensor, a rotor position of the rotor;
    coordinating, via a control algorithm programmed within the controller of the LIDAR sensor, the rotor position with the one or more laser signals of the LIDAR sensor, wherein coordinating the rotor position with the one or more laser signals of the LIDAR sensor further comprises switching a rotational direction of the one or more laser signals; and,
    defining, via the control algorithm, a sequencing control scheme based on the coordination so as to minimize interference between the laser signals and the rotor blades during rotation of the rotor.

13. A system for improving signal availability of a Light Detecting and Ranging (LIDAR) sensor mounted on a nacelle of a wind turbine, the system comprising:
    one or more sensors configured to generate signals indicative of a rotor position of a rotor of the wind turbine, the rotor having one or more rotor blades, the sensors comprising at least one LIDAR sensor configured to generate one or more laser signals towards the rotor of the wind turbine; and,
    a controller configured to receive the one or more laser signals, the controller comprising a control algorithm configured to coordinate the rotor position with the one or more laser signals of the LIDAR sensor so as to minimize interference between the laser signals and the rotor blades during rotation of the rotor, wherein coordinating the rotor position with the one or more laser signals of the LIDAR sensor further comprises switching a rotational direction of the one or more laser signals.

14. The system of claim 13, wherein the one or more sensors further comprise at least one of main shaft positional sensors, hub sensors, or pitch system sensors.

15. The system of claim 13, wherein the controller comprises at least one of a LIDAR controller or a wind turbine controller.

16. The system of claim 13, wherein the laser signals comprise fiber-optic-based laser signals.

17. The system of claim 13, wherein the controller is further configured to optimize geometry of the one or more laser signals, wherein the geometry of the one or more laser signals comprises at least one of cone angle shape, fore-aft orientation, or side-to-side orientation of the one or more laser signals.

18. The system of claim 17, wherein the controller is further configured to coordinate the rotor position with the one or more laser signals of the LIDAR sensor by:
    receiving the geometry of the one or more laser signals and laser signal switch times, and defining, via the control algorithm, a sequencing control scheme for the LIDAR sensor based on the laser signals and the switch times.

19. The system of claim 13, wherein the controller is further configured to coordinate the rotor position with the one or more laser signals of the LIDAR sensor by:

switching the one or more laser signals off as one of the rotor blades rotates through a path of the laser signals, and switching the one or more laser signals on if the rotor blades are not in the path of the laser signals.

* * * * *